April 18, 1967 R. KREMP ETAL 3,314,346
LIGHT CONTROLLED SHUTTER
Filed Sept. 28, 1964 4 Sheets-Sheet 1

Fig.1

INVENTORS
RUDOLF KREMP
GERD KIPER
BY
Michael J. Striker

April 18, 1967  R. KREMP ET AL  3,314,346
LIGHT CONTROLLED SHUTTER
Filed Sept. 28, 1964  4 Sheets-Sheet 4

Fig.4

INVENTOR.
RUDOLF KREMP
GERD KIPER
BY

United States Patent Office 3,314,346
Patented Apr. 18, 1967

3,314,346
LIGHT CONTROLLED SHUTTER
Rudolf Kremp, Grunwald, Munich, and Gerd Kiper, Unterhaching, Munich, Germany, assignors to Agfa Aktiengesellschaft, Leverkusen, Germany
Filed Sept. 28, 1964, Ser. No. 399,799
Claims priority, application Germany, Sept. 28, 1963, A 44,161
16 Claims. (Cl. 95—10)

ABSTRACT OF THE DISCLOSURE

A camera wherein the shutter is movable from a closed position to open position and back to closed position and wherein the shutter is normally held in closed position by manually controlled means. Control means is provided to determine the exposure time and such control means includes holding means for releasably holding the shutter in open position on operation of the manually controlled means and an electric circuit comprising light-sensitive electromagnetic means operative to effect movement of the shutter from open back to closed position with a delay which is a function of the intensity of scene light and control switch means actuated by the manually controlled means to operate the electromagnetic means in the course of release of the shutter for movement to open position.

---

The present invention relates to a light controlled shutter for a photographic camera, and more particularly to a shutter including leading and trailing shutter means, each including a shutter blade and a shutter ring. In shutters of this type, a leading shutter blade which normally covers the aperture of the camera is released to move to a position opening the aperture, whereupon the trailing shutter blade is released to move from a normal position in which it uncovers the aperture to a closing position closing the aperture.

In the copending application Ser. No. 59,375 filed by Gerd Kiper, it has been proposed to control the release of the trailing shutter means in accordance with the variations of the resistance of a light sensitive resistor. The leading shutter ring is mechanically released by a manual operation, and has a control projection which actuates a switch means in the circuit of a solenoid which causes release of the trailing shutter ring after the leading shutter ring has run down to its exposure position in which the aperture is opened. After the switch means is actuated, the light sensitive resistor, which is connected into the circuit of the solenoid, determines the time period after which the solenoid causes release of the trailing shutter ring.

In this construction, the shortest possible exposure time is the sum of the time required by the leading shutter ring and shutter blade to move from its normal exposure preventing position to the exposure position plus the shortest possible time in which the solenoid can actuate the holding means by which the trailing shutter ring is held in the exposure position. In this manner, a minimum exposure time is inherent in the construction of the shutter, which may be too long to obtain the correct exposure under certain conditions.

It is one object of the invention to overcome this disadvantage of known light controlled shutter arrangements with leading and trailing shutter means, and to reduce the minimum exposure time as compared with known light controlled shutters.

Another object of the invention is to initiate the release of the trailing shutter means at the moment in which the leading shutter means is released, and to delay the actual movement of the trailing shutter means to the exposure preventing position in accordance with the amount of light falling on a light sensitive resistor.

Another object of the invention is to retard the first part of the movement of the leading shutter means to the exposure position so that the same is reached by the leading shutter means later in relation to the initiation of the movement of the second shutter means whereby the exposure time is further reduced.

Another object of the invention is to retard the first part of the movement of the leading shutter means toward the exposure position until a solenoid energized upon release of the leading shutter means to release the trailing shutter means, is fully energized and capable of operating the means by which the trailing shutter means is released.

Another object of the invention is to provide a control circuit including an electromagnetic means and a light sensitive resistor, with a control switch operated by a spring loaded pawl upon release of the same by a manually operated lever, so that the speed of actuation of the switch does not depend on a manual operation.

With these objects in view, the present invention relates to a camera comprising leading shutter means biased to turn in one direction from an exposure preventing position to an exposure position; trailing shutter means biassed to turn in the same direction from an exposure position to an exposure preventing position; and manually operated means cooperating with the leading shutter means for holding the same in said exposure preventing position and being operable for releasing the same for movement to the exposure position.

In accordance with the present invention, control means are provided in the camera and include holding means for holding the trailing shutter means in the exposure position, and an electric circuit by which the holding means are controlled.

In one embodiment of the invention, the electric circuit comprises electromagnetic means, for example a solenoid, controlling the holding means so as to move the same between a holding position and a releasing position, light sensitive resistor means whose resistance is varied in response to light impinging thereon, a source of voltage, and control switch means actuated upon operation of the manually operated means when the leading shutter means is released.

The actuated control switch means cause actuation of the electromagnetic means and consequently release of the trailing shutter means by the holding means after a time period depending on the amount of light impinging the resistor means.

In one embodiment of the invention, the released leading shutter means, moving to the exposure position, closes a control switch connected in series with the electromagnetic means and the light sensitive resistor so that the electromagnetic means moves a holding means to a position releasing the trailing shutter means.

In another embodiment of the invention, the trailing shutter means abuts the leading shutter means, and would move with the same when the same is released by the manually operated means. However, upon actuation of the manually operated means, a switch is actuated which causes energization of the electromagnetic means, and locking of the trailing shutter means by a holding means. Thereupon, another switch is opened to deenergize the electromagnetic means after the leading shutter means is released and has started its movement. The energization of the electromagnetic means terminated after a time period determined by the amount of light impinging the light sensitive resistor so that the holding means releases the trailing shutter means permitting the same to move toward the exposure preventing position for closing the aperture of the camera which was opened by the leading shutter means.

In the preferred embodiments of the invention, the manually operated means include a spring loaded pawl, and a manually operated lever which normaly locks the spring loaded pawl. Upon release of the pawl, the same releases the leading shutter means, and actuates control switch means in the circuit of the electromagnetic means by which the start of the movement of the trailing shutter means is determined.

Due to the fact that a control switch means is actuated at the moment in which the leading shutter means starts its movement, and that the release of the trailing shutter means follows a predetermined time period after the actuation of the control switch, a minimum exposure time is achieved. This time can be further reduced if the leading shutter means is not permitted to move at its highest speed from the exposure preventing position to the exposure position under the action of a biasing spring, but is retarded during the first part of its movement, for example by driving a mass having a great inertia, so that the leading shutter means arrives later in the exposure position. The time during which the leading shutter means is retarded, is used for the energization of the electromagnetic means and for the actuation of the locking pawl which locks the trailing shutter means. In this manner, the minimum exposure time which can be achieved by the successive movements of the leading and trailing shutter means, is independent of the time required by the electromagnetic means to cause release of the trailing shutter means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
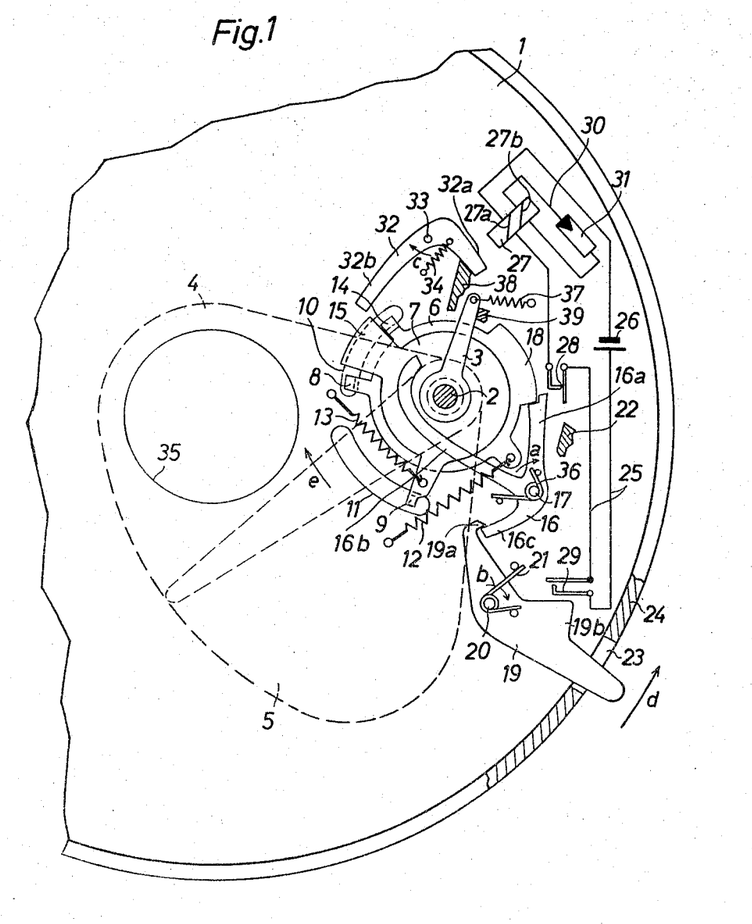
FIG. 1 is a fragmentary elevation illustrating a shutter according to one embodiment of the invention, and including a schematic diagram illustrating an electric circuit forming part of the embodiment.

Referring now to the drawings, and more particularly to FIG. 1, a shaft 2 is mounted for turning movement on a circular plate 1 of the housing which includes a cylindrical flange 24 having an opening 23. A cocking lever or arm 3 is fixed to shaft 2 and urged by a spring 37 secured to plate 1 into abutment with a stop 39 on plate 1. Shaft 2 projects beyond plate 1 and can be manually turned in counterclockwise direction as viewed in FIG. 1 for cocking the shutter, as will be explained hereinafter in greater detail.

A leading shutter ring 6, a trailing shutter ring 7, a leading shutter blade 4, and a trailing shutter blade 5 are also mounted for turning movement on shaft 2, the shutter blades and shutter rings being, respectively, located on opposite sides of plate 1. The leading shutter ring 6 has a transverse projection 8 passing through a circular slot 10 in plate 1 and engaging the leading shutter blade 4 on the other side of plate 1. The trailing shutter ring 7 has a transverse projection 9 passing through a circular slot 11 in plate 1 and engaging the trailing shutter blade 5 on the other side of plate 1. Shutter ring 6 and shutter blade 4 constitute a leading shutter means, and shutter ring 7 and shutter blade 5 constitute a trailing shutter means. Biasing means in the form of springs 12 and 13 are respectively secured to the leading and trailing shutter means, and to plate 1 to urge the shutter means to turn in clockwise direction as indicated by the arrow e. The trailing shutter means is blocked in the normal position of FIG. 1 by the arm 16a of a pawl 16 engaging a radial projection 18 of the leading shutter ring 6, and in this position, the leading shutter blade 4 closes the aperture 35 and prevents an exposure.

The trailing shutter ring 7 has a radial projection 15 abutting a transverse projection 14 of the leading shutter ring 6 so that turning movement of the trailing shutter means 7, 5 is blocked by the leading shutter means 6, 4 which is blocked by pawl 16. The trailing shutter blade 5 is held in a position spaced from the aperture 35 and permitting an exposure.

Pawl 16 is turnable about a pivot 17 on plate 1 and has a second arm 16c cooperating with an abutment 19a on a manually operated lever 19 which has a portion projecting through opening 23 out of the housing 1, 24 and adapted to be manually turned in the direction of the arrow d about a pivot 20 on plate 1.

A spring 21 abuts a stop on plate 1 and another stop on the outer arm of the manually operated lever 19 to urge the same to the position shown in FIG. 1. When lever 19 is turned in counterclockwise direction, abutment 19a will release the end of arm 16c of pawl 16 which is urged by a spring 36 abutting stops or pawl 16 and on plate 1 to turn in the direction of the arrow a to a position in which arm 16a releases projection 18 of the leading shutter ring 6.

When lever 19 is turned in counterclockwise direction against the action of spring 21, pawl 16 is released, and spring 36 will turn the same in clockwise direction to released position abutting the stop 22 on plate 1 while the leading shutter means 6 and 4 will be free to turn under the action of spring 12 in clockwise direction when projection 18 is released by arm 16a.

Pawl 16 has a third cocking arm 16b projecting into the region of movement of the cocking arm 3 on shaft 2. When shaft 2 is turned in counterclockwise direction, cocking arm 3 engages the end of cocking arm 16b and turns pawl 16 in counterclockwise direction against the action of spring 36 from the position abutting stop 22 toward the illustrated normal position. During such movement, arm 16c engages a slanted face of portion 19a of lever 19, turns lever 19 slightly in counterclockwise direction, and passes under the abutment 19a, whereupon spring 21 turns lever 19 back to the illustrated position locking pawl 16 in the illustrated cocked position.

Cocking arm 3 also engages projection 14 of the leading shutter ring 6 which abuts projection 15 of the trailing shutter ring 7 also in the run down or uncocked position, not shown, of the shutter, so that the leading and trailing shutter means are turned from the run down position to the illustrated cocked position in which projection 18 is disposed to permit the return of locking arm 16a of pawl 16 to the illustrated position. It will be understood that projections 8 and 9 will be located near the other ends of slots 10 and 11, respectively, in the run down positions of shutter rings 6 and 7. Projections 14 and 15 are both located on the near side of plate 1, as viewed in FIG. 1, and in the same plane as cocking arm 3.

Projection 15 of the trailing shutter ring 7 cooperates with a holding means, shown to be an angular member 32 mounted for turning movement on a pivot 33 of plate 1 and urged by a spring 34 to turn in the direction of the arrow c into abutment with a stop 38 on plate 1. Holding member 32 can be turned in the opposite counterclockwise direction to a position in which its arm 32b engages projection 15 of the trailing shutter ring 7 and holds or blocks the same against turning movement under the action of spring 13. Electromagnetic means 27 are mounted on plate 1 for moving the holding means 32 between the position releasing the trailing shutter means 7, 5 and a position blocking movement of the same. The circuit of electromagnetic means 27 is only schematically indicated for the sake of simplicity, and includes a normally closed control switch 28 having a switch arm operated by arm 16a of pawl 16, a second normally open control switch 29 having a switch arm operated by a projection 19b of manually operated lever 19, a battery, miniature accumulator, or other source of voltage 26, all connected in series with a main winding 27a of electromagnetic means 27.

When lever 19 is manually operated, control switch 29 is closed, and a current flows through the closed control switch 28 and the main winding of electromagnetic means 27 so that the same is energized and attracts arm 32a of holding member 32 whereby the same is turned in counterclockwise direction to a blocking position in which arm 32b engages projection 15 of the trailing shutter means 7, 5 and blocks movement of the same.

Electromagnetic means 27 includes a second winding 27a connected into a second circuit 30 in series with light sensitive resistor 31 whose resistance varies in accordance with the amount of light impinging thereon. The illustration of the position of resistor 31 is schematic, and it will be understood that resistor 31 is arranged at the front of the camera housing to be exposed to light, whereas the other parts of the circuit are located within the camera housing.

Directly after holding member 32 has been moved to the position blocking movement of the trailing shutter means, continued manual turning of lever 19 in the direction of the arrow d will cause release of arm 16c of pawl 16 by abutment 19a so that spring 36 will turn pawl 16 to a position in which arm 16a releases projection 18 of the leading shutter ring 6, permitting the same to turn together with the leading shutter blade 4 in clockwise direction as indicated by arrow e to a position in which aperture 35 is opened and the exposure is started. The trailing shutter means 7, 5 cannot yet follow such movement since it is blocked by holding member 32.

Pawl 16 continues its movement in the direction of the arrow a under the action of spring 36 until abutting stop 22, and during such movement, arm 16a engages the contact arm of control switch 28 and opens the same so that the main winding of electromagnetic means 27 is disconnected from the source of voltage 26 since control switch 28 interrupts the primary circuit 25.

However, due to the inductivity of the secondary winding 27b, electromagnetic means 27 still acts on holding member 32 to hold the same in the blocking position for a very short time so that holding member 32 is released for movement under the action of spring 34 to a position releasing the trailing shutter means 15, 7, 5 only after a certain delay which depends on the resistance of the light sensitive resistor 31. Such resistance depends on the amount of light impinging resistor 31, so that the trailing shutter means will be released for movement to the exposure preventing position closing aperture 35 after a certain time period depending on the amount of light impinging on resistor 31.

It will be seen that, contrary to the prior art, the release of the trailing shutter means is initiated by pawl 16 opening control switch 28 at the moment in which the leading shutter means is released for movement toward the exposure position. Therefore, the exposure time depends only on the time during which the secondary winding 27a is effective for holding holding member 32 in the position blocking the trailing shutter means, and such time depends on the amount of light falling on resistor 31 and varying its resistance which influences the time of discharge of the induced voltage of the secondary winding 27a through resistor 31.

Due to the fact that the leading shutter ring 6 is released about at the same time as control switch 28 is opened, the time required by the leading shutter means for running down, has no influence on the exposure time, as it has in known constructions in which a control switch is actuated by the run down leading shutter means.

As explained above, the run down leading and trailing shutter means are cocked by turning of shaft 2 with cocking arm 3 which engages projection 14 of the leading shutter ring 6 which in turn abuts projection 15 of the trailing shutter ring 7 so that both shutter rings, and the corresponding shutter blades, are turned back from the run down position to the illustrated cocked position. At the same time, cocking arm 3 engages arm 16b of pawl 16 to turn the same to the cocked position in which it is held by the abutment 19a of manual level 19. Shaft 2 may be connected in a known manner to the film transporting lever so that the shutter is cocked while the film is transported.

Figure 2:
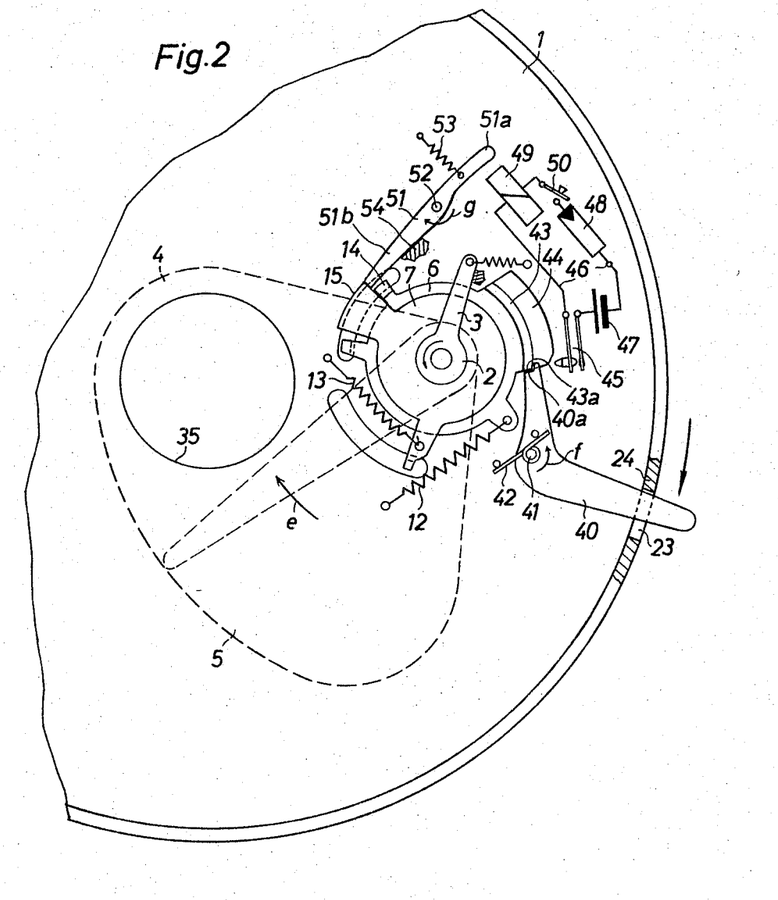
FIG. 2 is a fragmentary elevation illustrating a second embodiment of the invention, and including a schematic diagram illustrating an electric circuit forming part of this embodiment.

The construction of shutter rings 6 and 7 and shutter blades 4 and 5 in the embodiment of FIG. 2 corresponds to the construction described with reference to FIG. 1. The leading and trailing shutter means are mounted for turning movement on a shaft 2 which carries a cocking arm. The leading shutter ring 6 has a radially projecting lug 44 provided with a part-circular axially projecting ridge 43. A manually operated lever 40 is loaded by a spring 42 mounted on the pivot 41 of lever 40 and cooperating with stops on plate 1 and on lever 40 to bias lever 40 to turn in a direction of the arrow f to a position in which lever 40 abuts the edge of a slot 23 in the wall 24 of the housing. An abutment or shoulder 40a engages in this position the edge of ridge 43 and thus blocks turning movement of the leading shutter means 4, 6 in clockwise direction under the action of spring 12. When manually operated lever 40 is turned in clockwise direction, the leading shutter ring 6 is released, and the leading shutter means 4, 6 turns in the direction of the arrow e to a position opening aperture 35 in plate 1 and permitting an exposure while the trailing shutter means 5, 7 remains in the illustrated position spaced from aperture 35.

A holding means shown to be a holding lever 51 turnable about the pivot 52 on plate 1 is urged by spring 53 to turn to the illustrated blocking position in which arm 51b engages projection 15 of the trailing shutter ring 7 and blocks movement of the trailing shutter means. Movement of holding lever 51 in counterclockwise direction is limited by a stop 54 on plate 1.

Holding means 51 is controlled by an electromagnetic means 49 which is connected into a circuit including a main switch 50, a light sensitive resistor 48, a source of voltage 47, and a normally open control switch 45, all connected in series in circuit 46.

An insulating projection on a contact arm of switch 45 is located in the path of turning movement of projecting lug 44 of the leading shutter ring 6.

Switch 50 may be omitted, and must be closed before each exposure, which may be accomplished by manually operated lever 40, or simply by directly closing switch 50 by manual operation. The purpose of switch 50 is to prevent an undesired flow of current in circuit 46.

In order to make an exposure, switch 50 is first manually closed, whereupon the manually operated lever 40 is turned in clockwise direction until it abuts the other edge of the opening 23 in wall 24. In this position, shoulder 40a releases the edge 43a of ridge 43, permitting the leading shutter ring 6 to turn together with the leading shutter blade 5 under the action of spring 12 in the direction of the arrow to a position opening aperture 35 and starting an exposure. However, directly after the start of the turning movement of the leading shutter means, the outer circumferential edge of lug 44 engages the contact arm of control switch 45 and closes the same so that the circuit 46 is closed and a voltage is applied to electromagnetic means 49. The voltage on the terminals of electromagnetic means 49 depends on the resistance of light sensitive resistor 48 which, inturn, depends on the amount of light impinging thereon. If the resistance of resistor 48 is greater, creation of a voltage on electromagnetic means 49 sufficient for attracting arm 51a of holding means 51 will be delayed for a longer time than if the resistance of resistor 48 is smaller due to a different amount of light impinging thereon.

As soon as the required voltage is applied to electromagnetic means 49 after a time depending on the amount of light impinging on resistor 48, holding lever 51 will be turned by electromagnetic means 49 in the direction of the arrow g against the action of spring 53 so that projection 15 of the trailing shutter ring will be released by arm 51b, permitting shutter ring 7 to turn under the action of spring 13 is clockwise direction together with the trailing shutter blade 15 until the same closes aperture 35. It will be seen that the time required by the leading shutter means to run down is used for energizing electromagnetic means 49 within a time determined by the amount of light impinging resistor 48, so that a minimum exposure time can be achieved, and the time required for running down of the leading shutter means does not form part of the exposure time, as in the prior art.

The shutter is cocked by turning shaft 2 with cocking arm 3 in counterclockwise direction so that arm 3 engages projection 14 of the leading shutter ring 6 which pushes projection 15 of the trailing shutter ring in the same counterclockwise direction until the abutment 40a of lever 40 which slides on the outer surface of ridge 43 during such turning movement of the trailing shutter ring 6, again snaps under the edge 43a of ridge 43 under the action of spring 42 whereby the leading shutter means is again held in the cocked position. Since the contact arm of control switch 45 is released by lug 44 in this position, as shown in FIG. 2, control switch 45 opens and spring 53 returns holding lever 51 to the illustrated blocking position, holding the trailing shutter means 15, 7, 5 in the illustrated cocked position.

The construction of the shutter of the embodiment of FIG. 3 corresponds substantially to the construction described with reference to FIG. 1, and corresponding parts are indicated by like reference numerals. The leading shutter means 6, 4, the trailing shutter means 7, 5, the coking means 2, 3, the pawl 16, and the manually operated level cooperate as described with reference to FIG. 1.

The holding means 73 is constructed similar to the holding means described with reference to FIG. 2 and is shown to be a lever urged by spring 74 to abut a fixed stop 75 in a position in which it is located opposite projection 15 of trailing shutter ring 7 to block turning movement of the trailing shutter means under the action of spring 12.

Figure 3:
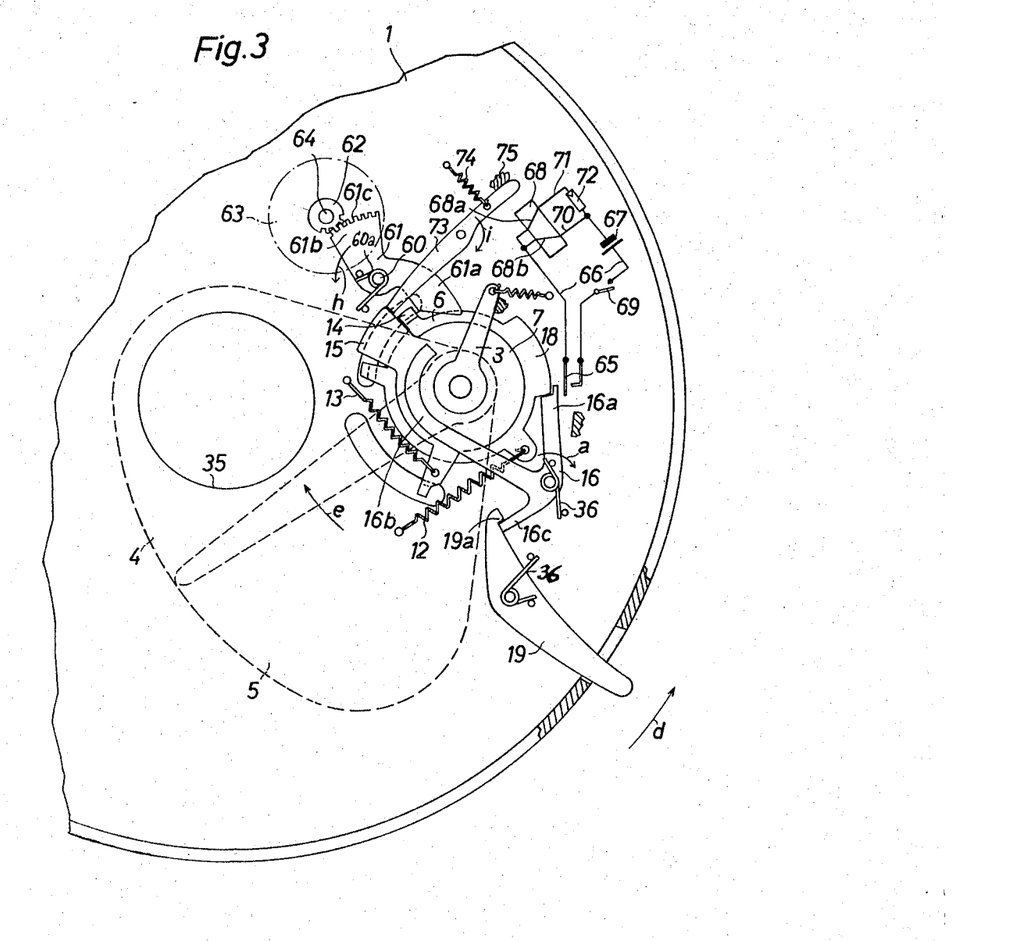
FIG. 3 is a fragmentary elevation illustrating a third embodiment of the invention, and including a schematic diagram illustrating an electric circuit forming part of this embodiment.

In the embodiment of FIG. 3, mechanical retarding means cooperate with the leading shutter means to retard the first part of the movement thereof from the illustrated position closing aperture 35 toward the exposure position in which aperture 35 is open. A coupling lever 61 is mounted on a pivot 60 of plate 1 for turning movement and has a coupling arm 61a abutting projection 14 of the leading shutter ring 6 in the cocked position of the shutter illustrated in FIG. 3. A spring 60a urges coupling lever 61 into this position by abutting a stop on lever 61 and another stop on plate 1. The other arm 61b of lever 61 has gear teeth 61c meshing with a pinion 62 on a shaft 64 which is mounted in a bore of plate 1 and carries on the other side of plate 1 a wheel of comparatively great mass and inertia. Other types of retarding or dampening means may be substituted, for example a pneumatic dampening piston may be displaced by lever 61.

An electric circuit 66 includes a normally open switch 69 which is manually closed before each exposure, or which may be operated by lever 19 substantially as described for control switch 29 in the embodiment of FIG. 1. A normally open control switch 65 has a contact arm cooperating with the arm 16a of pawl 16. Switches 69 and 65 are connected in series with a pair of windings 68a, 68b of an electromagnetic means 68. A light sensitive resistor 72 is connected by conductor 71 in series with winding 68a, and winding 68b is connected in parallel to winding 68a and resistor 72, the parallel branches being connected in series with the source of voltage 67 and with control switch 65.

In order to make an exposure, the manually operated lever 19 is turned in the direction of the arrow d until abutment 19a releases the arm 16c of the spring loaded pawl 16 which is turned by spring 36 to a position releasing projection 18 of the leading shutter ring 6 and closing the control switch 65 so that a voltage is applied by the voltage source 67 through the previously closed switch 69, and control switch 65 to the windings 68a and 68b of the electromagnetic means 68.

As soon as projection 18 is released by arm 16a, spring 12 urges the leading shutter ring 6 to turn in clockwise direction so that arm 61a of coupling lever 61 is engaged by projection 14 of trailing shutter ring 7 and lever 61 is turned in the direction of the arrow h whereby the meshing gears 61c and 62 cause rotation of the mass 63. Consequently, turning movement of the leading shutter means 4, 6 is retarded until projection 14 has turned through such an angle as to release arm 61a of lever 61 so that the leading shutter ring 6 is no longer coupled to the retarding means 63 and starts a faster movement under the action of spring 12. Only after the leading shutter means 4, 6 is disconnected by coupling lever 61 from the retarding means 63, the leading shutter blade 4 opens aperture 35. Consequently, as compared with the embodiments of FIGS. 1 and 2 in which no retarding means are provided, the aperture 35 will be open a short period of time later after actuation of the manually operated lever 19. This short period of time is evidently deducted from the exposure time which starts upon opening of aperture 35 and ends upon closing of aperture 35 by the trailing shutter blade 5.

When pawl 16 is released by manually operated lever 19 and closes control switch 65, a current flows through circuit 66 and to windings 68a and 68b. Winding 68b lies directly at the voltage, and a magnetic field starts to develop. However, since winding 68a is wound in the opposite direction, the development of an effective magnetic field by windings 68b is delayed by the opposing field of winding 68a. The opposing field is weaker than the field of winding 68b, since the resistor 72 is connected in series with winding 68a. The current flowing through winding 68a depends on the resistance of light sensitive resistor 72 which varies with the amount of light impinging resistor 72. Consequently, the strength of the opposing field of winding 68a depends on the amount of light impinging light sensitive resistor 72, and the time required for building up a sufficiently strong magnetic field to operate holding lever 73, depends on the amount of light impinging light sensitive resistor 72. When electromagnetic means 68 finally energized by winding 68b attracts holding lever 73, the same releases projection 15 of the trailing shutter ring 7, permitting the same to turn with the trailing shutter blade 5 under the action of spring 13 until aperture 35 is closed.

The shutter is cocked as described with reference to FIG. 1 by turning shaft 2 in counterclockwise direction so that arm 3 first engages projection 14 of the leading shutter ring 6 turning the same so that projection 15 of the trailing shutter ring 7 is pushed in the same direction. Thereupon, cocking arm 3 engages arm 16b of pawl 16 urging the same to fall behind projection 18 of the leading shutter ring 6 when the same has been turned far enough. As soon as pawl 16 is turned to this position, it snaps behind abutment 19a of manually operated lever 19 and is locked by the same in the cocked position under the action of spring 36.

The time period during which the leading shutter means are retarded by the retarding means 61, 63 can be determined by a suitable design of the wheel 63, and is selected to be substantially equal to the delay of the reaction of electromagnetic means 68 caused by opposing winding 68a when light sensitive resistor 72 is impinged by very bright light and has its minimum resistance. Consequently, the exposure time is neither influenced by the time required for the running down of the leading shutter means, nor by the very short time required for a response of electromagnetic means 68, which time depends on the construction of the electromagnetic means. Consequently, extremely short exposure times can be achieved and precisely controlled.

The embodiment of FIG. 4 combines retarding means as described with reference to the embodiment of FIG. 3, with a control of the holding means for the trailing shutter means similar to the construction of FIG. 1. A leading shutter ring 80, and a trailing shutter ring 81 are mounted for turning movement about an axis coinciding with the center of a circular housing 1'. The aperture, not shown, is surrounded by shutter rings 80 and 81, and is normally covered by the leading shutter blade 82 which is connected by a pivot joint 83b to the leading shutter ring 80, and has a slot in which a pin 83a secured to the trailing shutter ring 81 is located. Consequently, the leading shutter blade 82 will perform a composite movement when shutter rings 80 and 81 turn relative to each other. The trailing shutter blade is not shown for the sake of simplicity, and is connected to the leading and trailing shutter rings for shutter blade 82. A spring 84 is secured to housing 1' and to the leading shutter ring 80 to urge the same to turn in counterclockwise direction as indicated by the arrow k. The trailing shutter ring 81 is urged by spring 85 in the same direction. The leading shutter ring 80 has a radial projection 86 which engages a fixed abutment 87 on housing 1' after shutter ring 80 has turned a certain angle in counterclockwise direction. In the normal closed position of the shutter, in which a pawl 100 locks shutter ring 80 by engaging a shoulder 94a of a projection 94, projection 86 of the leading shutter ring 80 touches the arm 88a of a coupling lever 88 which is mounted on a pivot 89 on the housing for turning movement, and is normally urged by a spring 90 to turn in counterclockwise direction to a position abutting a stop 118.

The other arm 88b of lever 88 has gear teeth 88c meshing with a gear pinion 91 turnable about a shaft 93 together with a wheel 92 of comparatively great mass and inertia.

A pin 95 fixed to the trailing shutter ring 81 abuts a lateral edge of projection 94 of the leading shutter ring 80, and since the same is normally locked by pawl 100, spring 85 cannot turn the trailing shutter ring 81 in the normal closed position of the shutter.

Projection 94 carries a fixed projection stud 96 which cooperates with the arm 97a of a cocking lever 97 which is turnable about a pivot 99 and urged by a spring 98 to turn in the direction of the arrow m to the position illustrated in solid lines abutting a fixed stop 119. The other arm 97b can be manually operated, or a shaft may be secured to lever 97 instead of pivot 99 and connected in the conventional manner to the film transporting lever.

Pawl 100 by which the leading shutter means, and indirectly the trailing shutter means are retained in the cocked position is mounted on a pivot 101 on housing 1' and loaded by a spring 102 to turn in the direction of the arrow to a position releasing shoulder 94a of projection 94.

Figure 4:
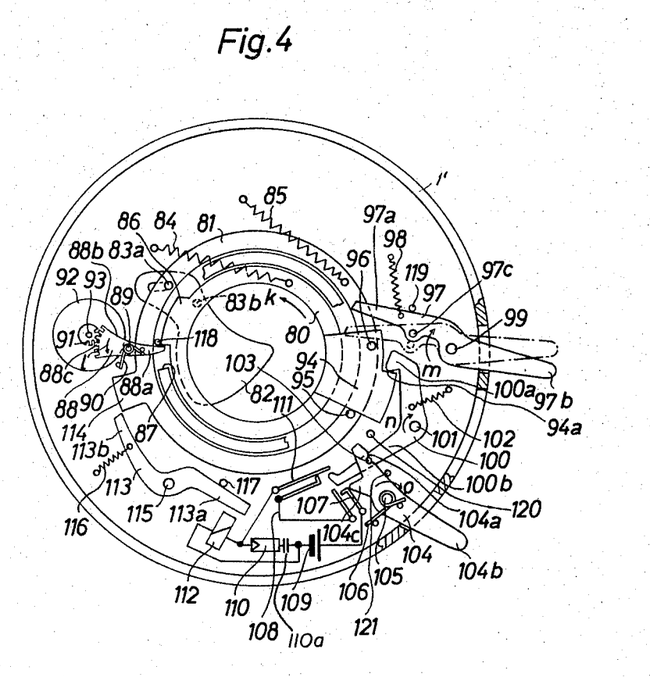
FIG. 4 is a fragmentary elevation, with certain parts omitted for the sake of clarity and simplicity, and including a schematic diagram illustrating an electric circuit forming part of this embodiment.

Pawl 100 is held in the cocked locking position shown in FIG. 4 by a manually operated lever 104 which has a recess 104a engaging a pin 103 fixed to arm 100b of pawl 100 under the action of a spring 106 which is mounted on the pivot 105 of the manually operated lever 104 and urges the same to turn in clockwise direction as indicated by the arrow o. Spring 106 abuts a stop on casing 1' and another stop on the arm 104b of the manually operated lever 104.

Upon manual turning of lever 104 in counterclockwise direction, pin 103 will be released, and spring 102 will turn pawl 100 in the direction of the arrow n to a released position abutting a stop 120 on housing 1'. A stop 121 limits turning movement of the manually operated lever 104. Lever 104 has a projection 104c cooperating with a contact arm of a normally open switch 107.

Holding means in the form of a lever 113 mounted on pivot 115 are provided for blocking movement of the trailing shutter ring 81 with its shutter blade after the trailing shutter ring 80 has started its turning movement. A spring 116 normally urges holding lever 113 to the illustrated position in which arm 113a abuts a fixed stop 117, but when electromagnetic means 112 is energized, holding lever 113 is turned in clockwise direction to a position in which its arm 113b is located behind a shoulder formed by projection 114 of the trailing shutter ring 81, so that movement of the same under the action of spring 85 is blocked, even if projection 94 of the leading shutter ring 80 has moved away from pin 95 on the trailing shutter ring 81.

As in the other embodiments, the control means of the shutter include, in addition to the holding means 113 an electirc circuit including an electromagnetic means, a light sensitive resistor 110, a battery 109, the normally open switch 107, and a normally closed control switch 111 which has a contact arm cooperating with the end portion of arm 100b of pawl 100.

One terminal of battery 109 is connected to the normally open switch 107 which is connected in series with the normally closed control switch 111. The electromagnetic means 112 is connected in parallel with the light sensitive resistor 110 and a capacitor 110a which is connected in series with resistor 110. The electromagnetic means and the parallel resistor and capacitor, are connected to the other terminal of the battery 109.

In order to make an exposure, the manually operated lever 104 is turned in counterclockwise direction so that the recess 104a releases pin 103 and pawl 100 is turned by spring 102 in the direction of the arrow n to release shoulder 94a of projection 94 of the leading shutter means 80, 82.

At the same time, projection 104c closes switch 107 so that a current starts flowing from the battery through the normally closed control switch 111, and the electromagnetic means 112, and resistor 110. The energized electromagnetic means 112 attracts arm 113a of holding lever 113 so that the same turns in clockwise direction to a position blocking movement of the trailing shutter ring 81 by engaging projection 114.

In the meantime, the leading shutter ring 80 released by pawl 100, has started its movement in the direction of arrow k and moves away from pin 95 of the trailing shutter ring 81. Such movement is slow, since spring 84 has to overcome the resistance of the retarding means 88–93. Projection 86 of the leading shutter ring 80 turns coupling lever 88 in the direction of the arrow l so that the wheel 92 is rotated and retards due to its inertia the movement of the leading shutter means until coupling lever 88 assumes such an angular position as to be released by the leading edge of projection 86 of the leading shutter ring 80. Spring 90 returns the released coupling lever to its initial position, but since projection 86 is now free, the leading shutter means moves rapidly under the action of spring 84 in the direction of the arrow k until projection 86 abuts the fixed abutment 87. During such movement, the leading shutter blade 82 opens the aperture and assumes an exposure position.

The delay caused by the retarding means 88–93 is determined by the mass of wheel 92 which is selected so that the aperture, not shown, is opened by the leading shutter blade 82 only after coupling lever 88 has assumed the position disengaged from the leading shutter ring 80. The time is selected so as to compensate the smallest possible reaction time of electromagnetic means 112 which depends on constructive features of the electromagnetic means.

When portion 100a of pawl 100 releases shoulder 94a of projection 94 of the leading shutter ring 80, arm 104 assumes such a position as to engage the movable contact arm of control switch 111 and to open the same. The open switch 111 disconnects electromagnetic means 112 from the battery 109. However, electromagnetic means 112 is not immediately deenergized, since the charged capacitor 110a discharges through resistor 110 and continues to energize electromagnetic means 112 a short period of time depending on the capacity of the capacitor 110a, and the resistance of the photosensitive resistor 110.

When a great amount of light impinges photosensitive resistor 110, its resistance is smaller, and the capacitor will discharge faster so that the energization of electromagnetic means continues only for a very short time whereupon holding means 113 is released by the electromagnetic means 112 permitting spring 116 to turn holding means 113 from the position engaging projection 114 and blocking the trailing shutter ring 81 to the illustrated position in which the trailing shutter ring with the trailing shutter blade is free to turn in a direction of the arrow $k$ since it is neither blocked by holding means 113, nor by projection 94 of the leading shutter ring 80 which in the meantime has moved toward the closed position.

Due to the fact that the resistance of the light sensitive resistor 110 depends on the amount of light impinging thereon, the delay in the release of the trailing shutter means by holding means 113 depends on the amount of light sensed by the photosensitive resistor 110.

In order to cock the shutter, cocking lever 97 is turned in counterclockwise direction from the position shown in solid lines to the position shown in broken lines. Since the cocking lever engages pin 96 of the run down leading shutter means, the same is turned back until pin 97c engages the end portion 100a and turns pawl 100 to the locking position engaging shoulder 94a of the leading shutter ring 80.

The trailing shutter means has run down to a position in which pin 95 of the trailing shutter ring 81 abuts projection 94, so that projection 94 turns the trailing shutter ring 81 to a cocked position while moved by cocking lever 97. When pawl 100 locks the cocked leading shutter means, the trailing shutter means are also locked by engagement of pin 95 with projection 94.

When pawl 100 is turned by pin 97c of the cocking lever 97 to the position cooperating with shoulder 94a, pin 103 on arm 100b has moved so far along the edge of manually operated lever 104b, as to snap into recess 104a which is pressed against pin 103 by spring 106. In this position, the end of arm 100b is spaced from the contact arm of control switch 111 so that the same resiliently assumes its normal closed position. The manually operated lever 104 abuts stop 121 in a position in which the contact arm of switch 107 resiilently moves to a position in opening switch 107.

In all embodiments, the exposure time can be modified by variable additional resistors in the respective control circuit in order to compensate additional factors influencing exposure time, such as the aperture opening of the diaphragm and the film speed.

Different control circuits have been described with reference to FIGS. 1 and 4 for achieving the same operation of the holding means for the trailing shutter means, and different control circuits have been described with reference to FIGS. 2 and 3 to obtain a different operation of the holding means for the trailing shutter means. It will be appreciated that such corresponding control circuits can be exchanged, and that modified circuits including electromagnetic means and a light sensitive resistor may be used for operating the holding means in accordance with the present invention.

It will be understood that each of the elements described above, or two or more together, may also find a useful application in other types of light controlled shutters differing from the types described above.

While the invention has been illustrated and described as embodied in a trailing shutter means whose movement is initiated at the beginning of the movement of the leading shutter means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, spring-loaded shutter means including blade means movable from a closed position to an open position and back to closed position, and operating means movable to effect movement of said blade means back to closed position; manually controlled means including means for holding said operating means in a first position corresponding to the open position of said blade means and operative to release said operating means for movement to a second position corresponding to the closed position of said blade means; and control means separate from said manually controlled means and including retaining means for releasably retaining the operating means in said first position, and an electric circuit comprising light-sensitive electromagnetic means operative to effect movement of said operating means from first position to second position and to thereby effect movement of said blade means back to closed position with a delay which is a function of the intensity of scene light, and control switch means actuated by said manually controlled means to operate said electromagnetic means in the course of release of said operating means by said manually controlled means for movement to second position.

2. In a camera, in combination, spring-loaded means including leading shutter means biassed to turn in one direction from an exposure preventing position to an exposure position and a spring-loaded pawl releasably locking said leading shutter means in said exposure preventing position; trailing shutter means biassed to turn in said direction from an exposure position to an exposure preventing position; a manually controlled means cooperating with said pawl for holding said leading shutter means in said exposure preventing position and being operable for releasing said pawl so that the same releases said leading shutter means for movement to said exposure position; and control means including holding means for releasably holding said trailing shutter means in said exposure position, and an electric circuit comprising electromagnetic means controlling said holding means, light-sensitive resistor means responsive to light to vary the resistance thereof, and control switch means actuated by said released pawl upon operation of said manually controlled means at the beginning of the movement of said leading shutter means to cause actuation of said electromagnetic means and release of said trailing shutter means by said holding means after a time period depending on the amount of light impinging said resistor means.

3. In a camera, in combination, spring-loaded means including leading shutter means biassed to turn in one direction from an exposure preventing position to an exposure position and a spring-loaded pawl releasably locking said leading shutter means in said exposure preventing position; trailing shutter means biassed to turn in said direction from an exposure position to an exposure preventing position; a manually controlled means cooperating with said pawl for holding said leading shutter means in said exposure preventing position and being operable for releasing said pawl so that the same releases said leading shutter means for movement to said exposure position, said manually controlled means being a spring-loaded lever, having an abutment for locking said pawl in a cocked normal position when said lever is in a normal position of rest; manually operable cocking means cooperating with said leading shutter means, and said trailing shutter means for turning the same in an opposite direction back to said exposure preventing position and said exposure position, respectively, and cooperating with said released pawl to turn the same to said cocked normal position so as to be locked by said abutment of said lever; and control means including holding means for releasably holding said trailing shutter means in said exposure position, and an electric circuit comprising electromagnetic means controlling said holding means, light-sensitive resistor means responsive to light to vary the resistance thereof, and control switch means actuated by said released pawl upon operation of said manually controlled means at the beginning of the movement of said leading shutter means to cause actuation of said electromagnet means and release of said trailing shutter means by said holding means after a time period depending on the amount of light impinging said resistor means.

4. In a camera, in combination, spring-loaded means including leading shutter means biassed to turn in one direction; trailing shutter means biassed to turn in said direction; manually controlled means cooperating with said sprin-loaded means for holding said leading shutter means in said exposure preventing position and being operable for releasing the same for movement in said direction; retarding means connected to said leading shutter means for retarding the first part of the turning movement of the same toward said exposure position; and control means including holding means for releasably holding said trailing shutter means, and an electric circuit comprising electromagnetic means controlling said holding means, light-sensitive resistor means responsive to light to vary the resistance thereof, and the control switch means actuated by said released spring-loaded means upon operation of said manually controlled means and at the beginning of the movement of said leading shutter means to cause actuation of said electromagnetic means and release of said trailing shutter means by said holding means after a time period depending on the amount of light impinging said resistor means.

5. In a camera, in combination, a light controlled shutter comprising leading shutter means biased to turn in one direction; trailing shutter means biassed to turn in said direction and abutting said leading shutter means; a spring-loaded pawl having a normal cocked position blocking movement of said leading shutter means and a releasing position; manually controlled means biassed to assume a normal position for locking said pawl in said cocked position and being manually operable to release said pawl for movement to said releasing position whereby said leading shutter means turns in said direction; holding means having a blocking position for blocking movement of said trailing shutter means and a releasing position releasing said trailing shutter means; and a control circuit means including electromagnetic means for operating said holding means between said positions thereof, light-sensitive resistor means responsive to light to vary the resistance thereof, and a control switch actuated by said pawl in said releasing position at the beginning of the turning movement of said leading shutter means to cause actuation of said electromagnetic means and release of said trailing shutter means by said holding means after a time period depending on the amount of light impinging said resistor means.

6. A shutter as set forth in claim 5 and including a projection on said leading shutter means, a coupling lever cooperating with said projection and being turned by said projection during the first part of the turning movement of said leading shutter means to a position in which said projection releases said coupling lever, and retarding means operated by said coupling lever during turning movement of the same.

7. A shutter as claimed in claim 6 wherein said coupling lever has gear teeth and wherein said retarding means include a turnable wheel having a great mass, and a pinion secured to said wheel and meshing with said gear teeth.

8. In a camera, in combination, a light controlled shutter comprising leading shutter means biassed to turn in one direction; trailing shutter means biassed to turn in said direction and abutting said leading shutter means; a spring-loaded pawl having a normal cocked position blocking movement of said leading shutter means and a releasing position; manually controlled means biased to assume a normal position for locking said pawl in said cocked position and being manually operable to release said pawl for movement to said releasing position whereby said leading shutter means turns in said direction; spring-loaded holding means having a normal blocking position for blocking movement of said trailing shutter means and a releasing position releasing said trailing shutter means; and a control circuit means including electromagnetic means for moving said holding means to said releasing position thereof, light-sensitive resistor means responsive to light to vary the resistance thereof, and a control switch actuated by said pawl in said releasing position at the beginning of the turning movement of said leading shutter means to cause energizing of said electromagnetic means and release of said trailing shutter means by said holding means after a time period depending on the amount of light impinging said resistor means.

9. A light controlled shutter as set forth in claim 8 wherein said control switch is normally open, and wherein said electromagnetic means has two opposed windings, one of said windings being connected in series with said resistor means, and said one winding and said resistor means being connected in parallel with the othr winding, said circuit means including a source of voltage having means being connected in parallel with the other winding, and the other terminal connected to said control switch, said control switch being also connected to the other end of said other winding whereby upon closing of said control switch by said pawl, said other winding causes movement of said holding means to said releasing position after a time period influenced by the opposing field of said one winding depending on the variable resistance of said resistor means.

10. In a camera, in combination, a light controlled shutter comprising leading shutter means biassed to turn in one direction; trailing shutter means biassed to turn in said direction and abutting said leading shutter means; a spring-loaded pawl having a normal cocked position blocking movement of said leading shutter means and a releasing position; manually controlled means biased to assume a normal position for locking said pawl in said cocked position and being manually operable to release said pawl for movement of said releasing position whereby said leading shutter means turns in said direction; spring-loaded holding means having a blocking position for blocking movement of said trailing shutter means and a normal releasing position releasing said trailing shutter means; and a control circuit means including electromagnetic means for moving said holding means to said blocking position thereof, light-sensitive resistor means responsive to light to vary the resistance thereof, a normally open switch closed by said manually controlled means, and a normally closed control switch opened by said pawl in said releasing position at the beginning of the turning movement of said leading shutter means to effect delayed deenergization of said electromagnetic means depending on the varied resistance of said resistor means and release of said trailing shutter means by said holding means after a time period depending on the amount of light impinging said resistor means.

11. A light controlled shutter as claimed in claim 10 wherein said control circuit means include a primary circuit and a secondary circuit, said primary circuit including said normally open switch and said normally closed control switch connected in series, a source of voltage connected in series with said switches, a first winding of said electromagnetic means, and said secondary circuit including said light sensitive resistor means and a second winding of said electromagnetic means, said first winding when energized by closing of said normally open switch moving said holding means to said blocking position, and said second winding releasing said holding means for movement to said normal releasing position after a time period determined by the variable resistance of said resistor means.

12. A light controlled shutter as claimed in claim 10 wherein said normally open switch and said normally closed control switch are connected in series, a source of voltage having one terminal connected to one of said switches, a capacitor connected in series with said resistor means, said capacitor and said resistor means being connected in parallel with said electromagnetic means, and in series with the other switch and with the other terminal of said source of voltage so that upon closing of said normally open switch said electromagnetic means is energized and moves said holding means to said blocking position, while upon opening of said normally closed switch, said capacitor maintains said electromagnetic means energized for a time period depending on the variable resistance of said resistor means whereupon the released holding means returns to said normal releasing position permitting movement of said trailing shutter means.

13. A shutter as claimed in claim 10 and including a projection on said leading shutter means, a coupling lever cooperating with said projection and being turned by said projection during the first part of the turning movement of said leading shutter means to a position in which said projection releases said coupling lever, and retarding means operated by said coupling lever during turning movement of the same.

14. A shutter as claimed in claim 10 wherein said leading shutter means has a projection on which said trailing shutter means abuts, wherein said pawl has an arm located in the region of said projection, and including cocking means comprising a turnable arm turnable in the same direction as said one direction to a position engaging said projection of said leading shutter means for turning said leading and trailing shutter means in said opposite direction, said arm also engaging said arm of said pawl for turning the same to said normal cocked position wherein said pawl is locked by said manually operated means in said normal position of the same.

15. In a camera, in combination, a light controlled shutter comprising leading shutter means biased to turn in one direction; trailing shutter means biased to turn in said direction and abutting said leading shutter means; manually controlled means biased to assume a normal position for blocking movement of said leading shutter means, and being manually operable to release the same for movement in said one direction; spring-loaded holding means having a normal blocking position for blocking movement of said trailing shutter means and a releasing position releasing said trailing shutter means for turning movement in said one direction; and a control circuit including electromagnetic means for moving, when energized, said holding means to said releasing position, light sensitive resistor means responsive to light to vary the resistance thereof and connected in series with said electromagnetic means, and a source of voltage having one terminal connected to said resistor means, and a normally open control switch connected to the other terminal of said source of voltage and to said electromagnetic means, said control switch being located in the path of movement of said leading shutter means to be closed directly upon the start of movement of the same after release by said manually controlled means whereby said electromagnetic means is energized with a delay depending on the variable resistance of said resistor means and on the amount of light impinging the same whereby said trailing shutter means is released for turning movement in said direction after a delay depending on the variable resistance of said resistor means.

16. In a camera, in combination, a light controlled shutter comprising leading shutter means biassed to turn in one direction; trailing shutter means biassed to turn in said direction and abutting said leading shutter means; a spring-loaded pawl having a normal cocked position blocking movement of said leading shutter means and a releasing position; manually controlled means biassed to assume a normal position for locking said pawl in said cocked position and being manually operable to release said pawl for movement to said releasing position whereby said leading shutter means turns in said direction; spring-loaded holding means having a blocking position for blocking movement of said trailing shutter means and a normal releasing position releasing said trailing shutter means; and a control circuit means including electromagnetic means for moving said holding means to said holding position thereof, light-sensitive resistor means responsive to light to vary the resistance thereof, and a control switch actuated by said pawl in said releasing position at the beginning of the turning movement of said leading shutter means to cause delayed deenergization of said electromagnetic means depending on the varied resistance of said resistor means, and release of said trailing shutter means by said holding means after a time period depending on the amount of light impinging said resistor means.

References Cited by the Examiner
UNITED STATES PATENTS

| | | | |
|---|---|---|---|
| 3,208,365 | 9/1965 | Cooper, et al. | 96—60 |
| 3,257,919 | 6/1966 | Sato et al. | 95—10 |

FOREIGN PATENTS

| | | |
|---|---|---|
| 1,268,796 | 6/1961 | France. |

NORTON ANSHER, *Primary Examiner.*

J. F. PETERS, *Assistant Examiner.*